United States Patent
Jiang

(10) Patent No.: US 8,838,182 B2
(45) Date of Patent: Sep. 16, 2014

(54) PORTABLE ELECTRONIC DEVICE INCLUDING LIGHT SOURCES POSITIONED BETWEEN A DISPLAY PANEL AND A TOUCH PANEL

(71) Applicants: Shenzhen Futaihong Precision Industry Co., Ltd., Shenzhen (CN); Chi Mei Communication Systems, Inc., New Taipei (TW)

(72) Inventor: Qiu-Sheng Jiang, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/709,451

(22) Filed: Dec. 10, 2012

(65) Prior Publication Data
US 2013/0244729 A1  Sep. 19, 2013

(30) Foreign Application Priority Data
Mar. 14, 2012  (CN) .......................... 2012 1 0066114

(51) Int. Cl.
*H04W 88/02* (2009.01)
*H04M 1/02* (2006.01)
*H04M 1/22* (2006.01)

(52) U.S. Cl.
CPC ............ *H04W 88/02* (2013.01); *H04M 1/0266* (2013.01); *H04M 1/22* (2013.01)
USPC ........................................ 455/566; 455/550.1

(58) Field of Classification Search
USPC ............... 455/550.1, 566, 90.1; 342/173, 175
See application file for complete search history.

(56) References Cited

U.S. PATENT DOCUMENTS

2013/0100082 A1 *  4/2013  Bakin et al. ................... 345/175

* cited by examiner

*Primary Examiner* — Sam Bhattacharya
(74) *Attorney, Agent, or Firm* — Novak Druce Connolly Bove + Quigg LLP

(57) ABSTRACT

A portable electronic device includes an upper housing, a display panel mounted on the upper housing, a touch panel mounted on the upper housing and stacking on the display panel, and a plurality of light sources positioned between the display panel and the touch panel. The touch panel defines a plurality of key icons on one end of the touch panel by screen printing visible light transmittable inks. Each light source is corresponding and facing to one key icon to emit light to directly irradiate the key icons to display the key icons.

19 Claims, 6 Drawing Sheets

PORTABLE ELECTRONIC DEVICE INCLUDING LIGHT SOURCES POSITIONED BETWEEN A DISPLAY PANEL AND A TOUCH PANEL

BACKGROUND

1. Technical Field

The present disclosure relates to a portable electronic device.

2. Description of Related Art

Most of portable electronic devices, such as mobile phones and personal digital assistants, commonly have large liquid crystal panels and virtual keypad. The current backlight module for the virtual keypad commonly includes a light guiding device and light emitting diodes (LED). The guiding device and the LEDs are usually arranged around the sidewalls of the electronic device. The LEDs emit light, and the light is guided by the light guiding device to illuminate the virtual keypad to display the virtual keypad. However, the light guiding device increases the thickness of the portable electronic device.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
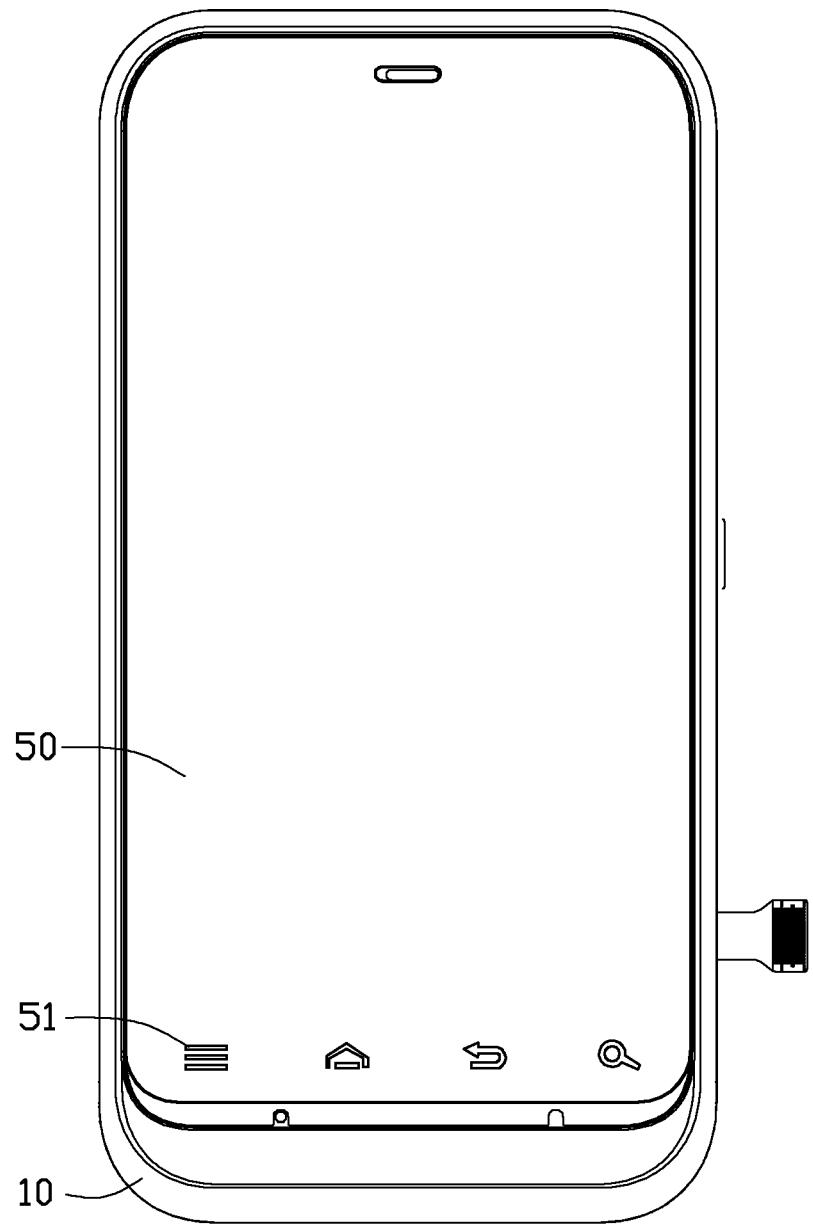
FIG. 1 is a schematic view of an exemplary embodiment of a portable electronic device having key icons in displaying.
Figure 2:
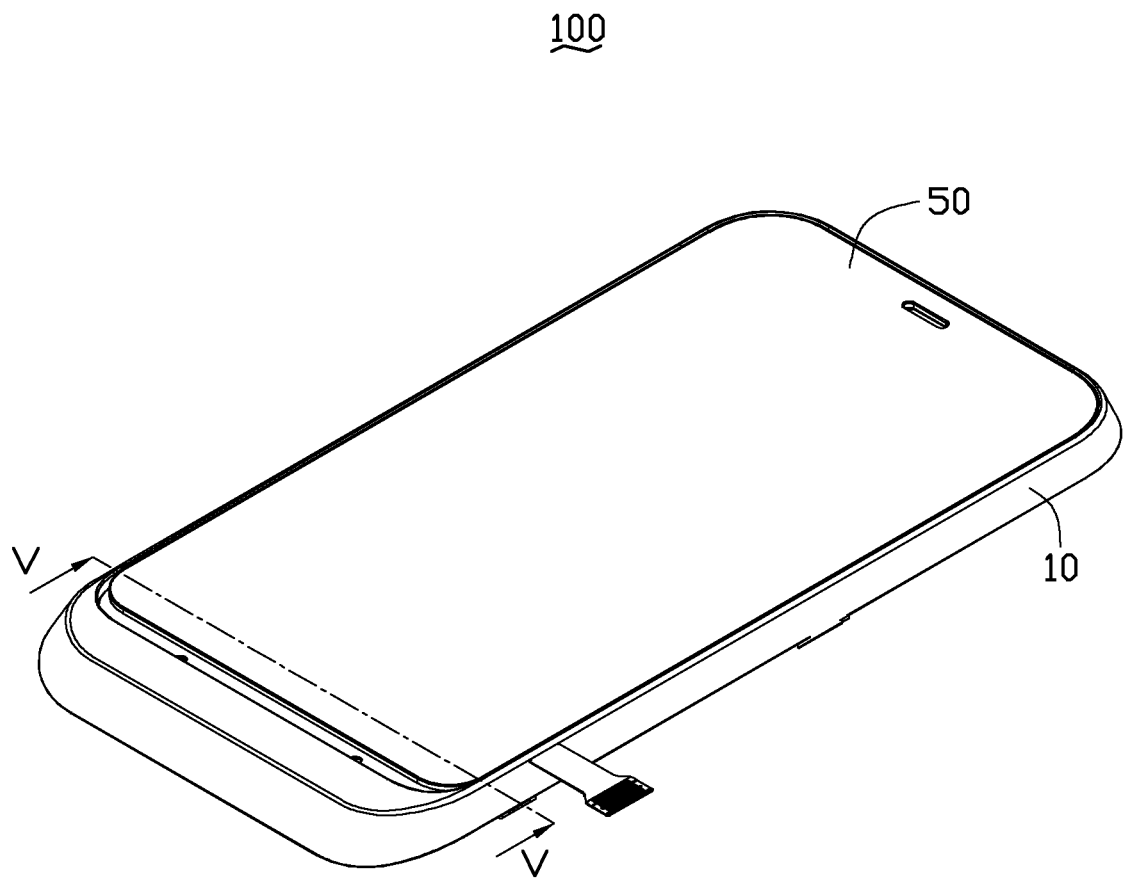
FIG. 2 is an isometric view of the electronic device shown in FIG. 1 with the key icons not in displaying.
Figure 3:
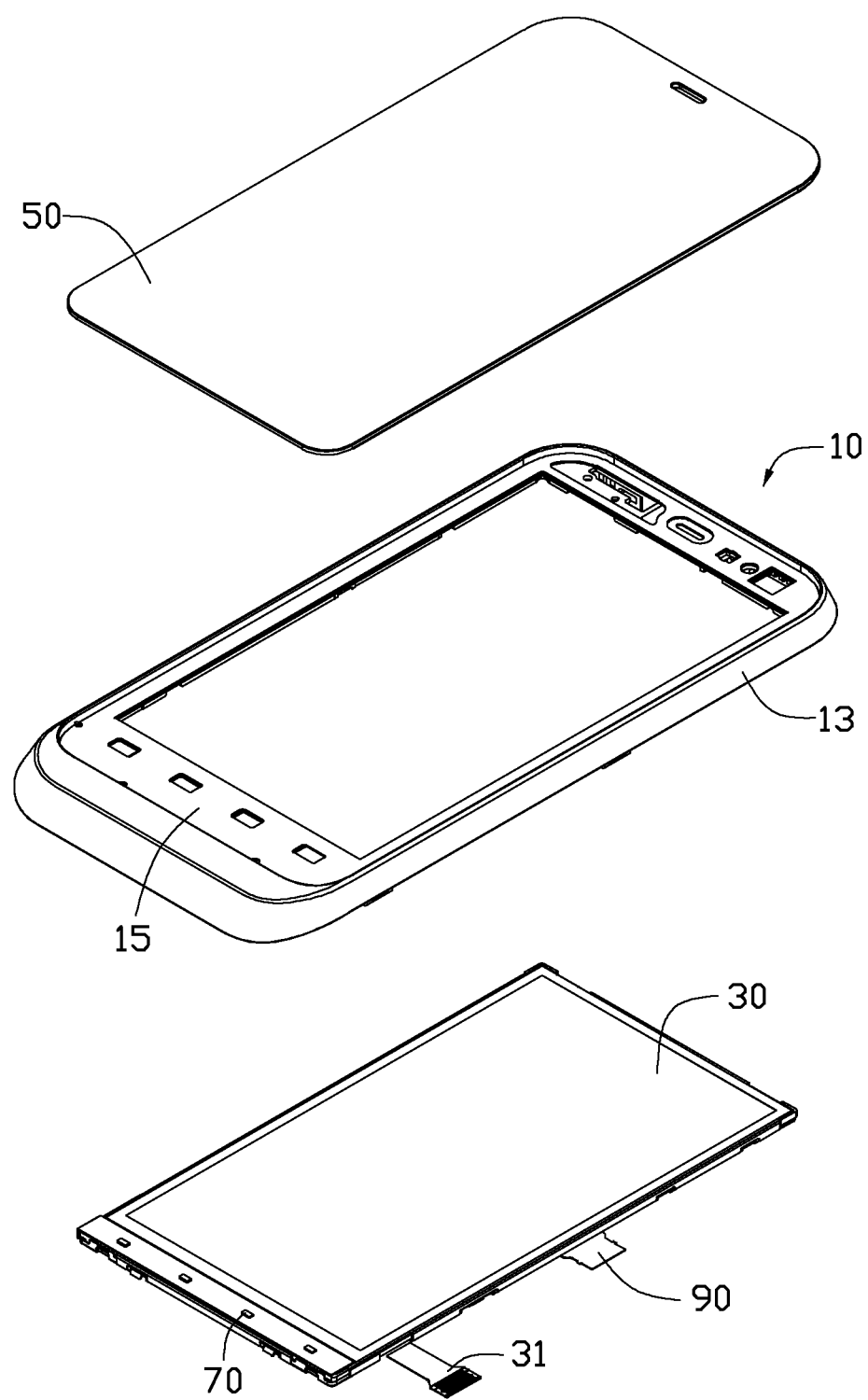
FIG. 3 is an exploded view of the electronic device of FIG. 2.

FIGS. 1-4 illustrate a portable electronic device 100 according to an exemplary embodiment. The portable electronic device 100 includes an upper housing 10, a display panel 30, a touch panel 50, a plurality of light sources 70, and an electrical connector 90. The touch panel 50 and the display panel 30 are mounted in the upper housing 10, with the touch panel 50 stacked on the display panel 30. The touch panel 50 defines a plurality of key icons 51. The light sources 70 are positioned between the display panel 30 and the touch panel 50 (see FIG. 5). The light sources 70 are defined corresponding to the key icons 51 of the touch panel 50. The electrical connector 90 electrically connects the display panel 30 and the light sources 70 to a main board (not shown) of the electronic device 100. The main board controls the light sources 70 to turn on to display the key icons 51 or to turn off to not display the key icons 51.

Figure 4:
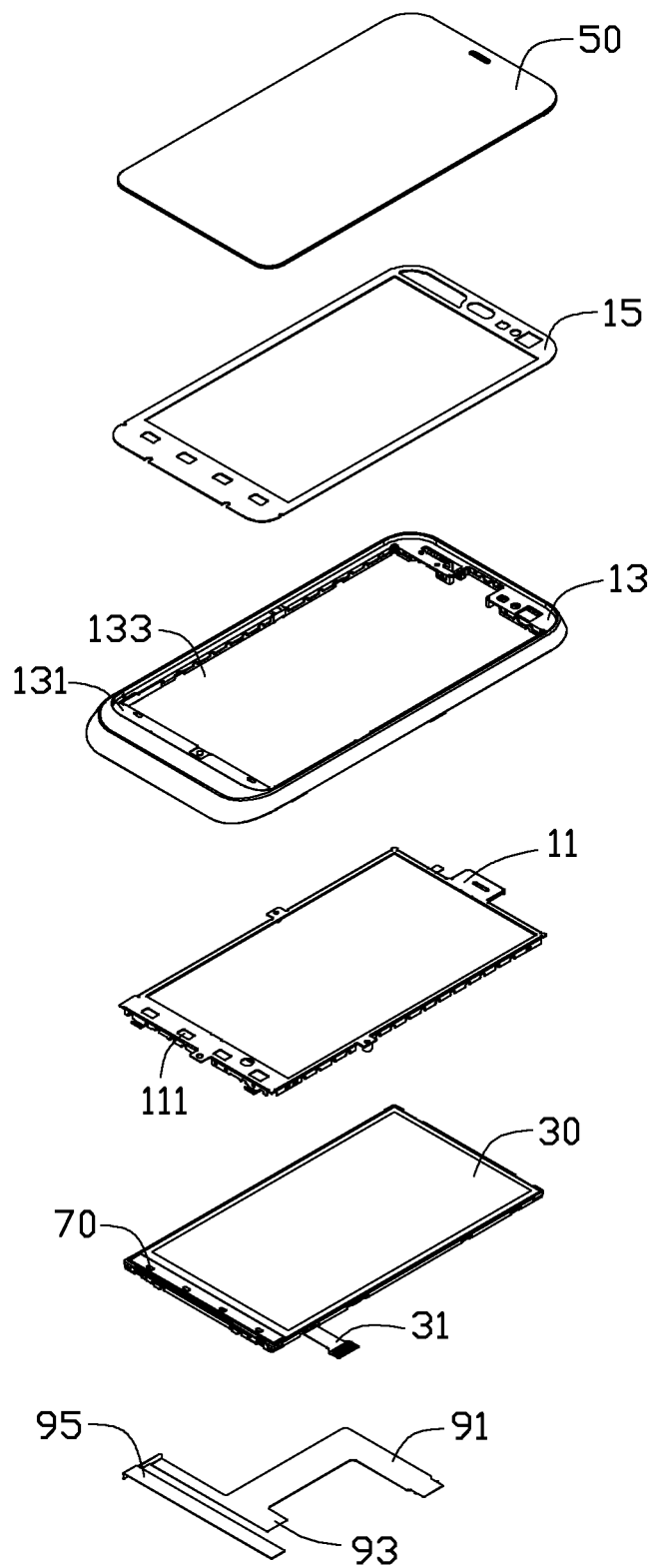
FIG. 4 is an exploded view of the electronic device of FIG. 3.

FIG. 4 shows that the upper housing 10 includes an inserting element 11 and a molding element 13. The inserting element 11 and the molding element 13 may be integrated by molding the molding element 13 to the inserting element 11 in a mold (not shown). The inserting element 11 is a rectangle frame made of iron, steel, or aluminum. In the embodiment, the inserting element 11 is made of steel, and has a thickness of about 0.2 mm. The inserting element 11 defines a plurality of through grooves 111 in one end of the inserting element 11, corresponding to the key icons 51 of the touch panel 50. The through grooves 111 are for the light sources 70 to pass through, and allow the light emitted by the light sources 70 to illuminate the key icons 51 and display the key icons 51.

The molding element 13 is approximately a rectangle frame. The molding element 13 defines a receiving notch 131 for receiving the touch panel 50. The molding element 13 further defines a display window 133 which communicates to the bottom of the receiving notch 131. The display window 133 is for receiving the display panel 30. In the embodiment, the inserting element 11 is also received in the display window 133 and positioned between the touch panel 50 and the display panel 30. The surface of the inserting element 11 facing to the touch panel 50 is level to the surface of the receive notch 131 (also see FIG. 5).

The upper housing 10 further includes an adhesion member 15 for adhering the touch panel 50 to the receive notch 131. The adhesion member 15 is adhered on the surface of the receive notch 131 and contacts the inserting element 11, and surrounds the display window 133.

The display panel 30 is a liquid crystal display (LCD) module and is received in the display window 133. The display panel 30 includes a wire arrangement 31 formed on one side of the display panel 30 opposite to the inserting element 11. The wire arrangement 31 connects to the main board of the electronic device 100.

In the embodiment, the key icons 51 are formed on one end of the touch panel 50 which is not a display region. The key icons 51 are screen printed on the surface of the touch panel 50 facing to the light sources 70 using visible light transmittable inks. When the light sources 70 emit light, the light irradiates the key icons 51 to display the key icons 51 for users to operate.

In the embodiment, the light sources 70 are LED light sources. The light sources 70 are formed on one side of the display panel 30 facing to the touch panel 50. The light sources 70 pass through the through grooves 111 of the inserting element 11 (see FIG. 6).

The electrical connector 90 includes a main portion 91, a first partial portion 93, and a second partial portion 95. The main portion 91 is "L" shaped with one end connecting to the main board of the electronic device 100, and the other end extending to form the first partial portion 93 and the second partial portion 95. The main portion 91 and the first partial portion 93 both locate on the side of the display panel 30 opposite to the inserting element 11, while the second partial portion 95 locates on the other side of the display panel 30 facing to the light sources 70 to connect the light sources 70 (also see FIG. 6). The first partial portion 93 electrically connects the wire arrangement 31 of the display panel 30.

Figure 5:
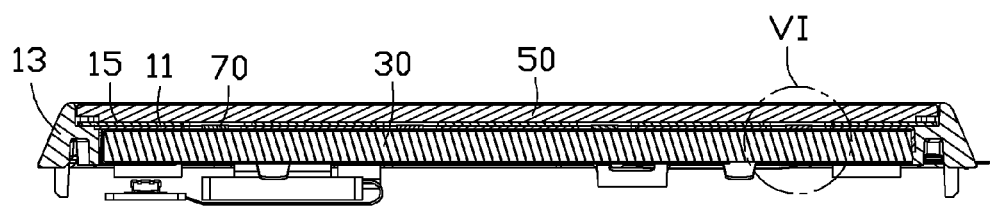
FIG. 5 is an enlarged cross-sectional view of the electronic device of FIG. 2 taking along line V-V.
Figure 6:
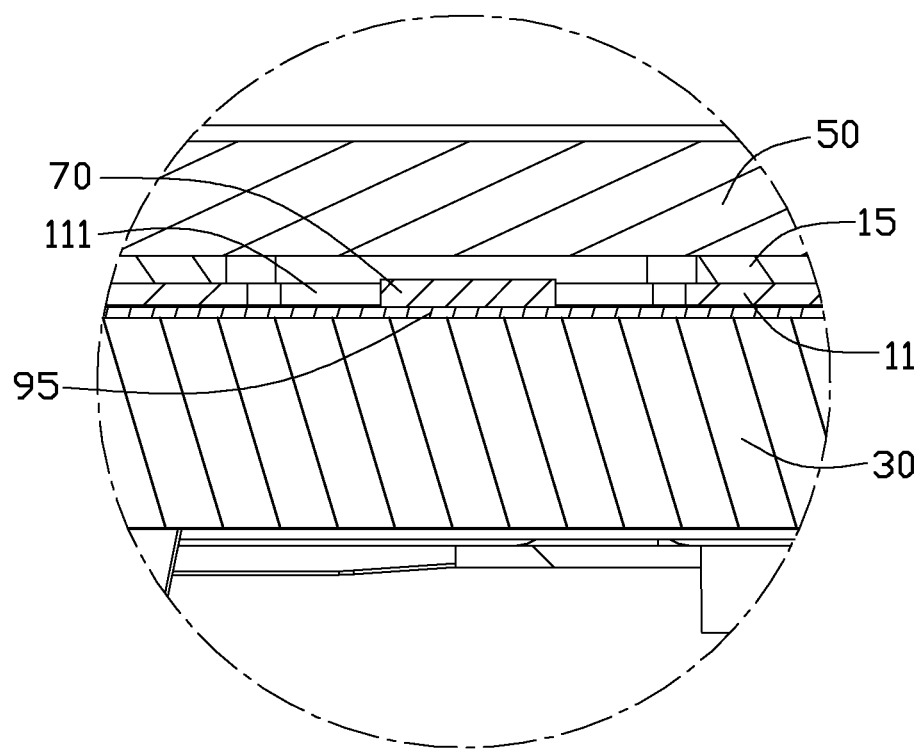
FIG. 6 is an enlarged view of the portion VI shown in FIG. 5.

FIGS. 5 and 6 also show that when assembling the electronic device 100, the electrical connector 90 is first mounted on the display panel 30 allowing the main portion 91 and the first partial portion 93 to be positioned on the side of the display panel 30 opposite to the inserting element 11. While the second partial portion 95 is positioned on the other side of the display panel 30 facing to the inserting element 11. Then, the light sources 70 are mounted on the display panel 30 to contact the second partial portion 95. After that, the touch panel 50 is adhered to the receive notch 131 of the upper housing 10 by the adhesion member 15. Then, the display panel 30 configuring with the electrical connector 90 and the light sources 70 are received in the display window 133, allowing each light source 70 to pass through each through groove 111 of the inserting element 11 and aim at one of the key icons 51. Finally, the electrical connector 90 is connected to the main board of the electronic device 100. As such, the electronic device 100 is finished. When in use, the main board controls the light sources 70 to turn on to emit light and irradiate the key icons 51 to display the key icons 51.

The portable electronic device 100 of the exemplary embodiment directly defines the light sources 70 on the display panel 30 to emit light to display the key icons 51, which avoids using big volume light guiding device to guide the light to display the key icons, thus saves volume and decreases the thickness of the electronic device 100. Furthermore, the key icons 51 are formed by screen printing visible light transmittable inks, the key icons 51 irradiated by the light look soft.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A portable electronic device, comprising:
an upper housing;
a display panel mounted on the upper housing;
a touch panel mounted on the upper housing and stacking on the display panel, the touch panel defining a plurality of key icons on one end of the touch panel, the key icons being visible light transmittable ink icons;
a plurality of light sources positioned between the display panel and the touch panel, each light source corresponding and facing to one key icon, the light sources emitting light to directly irradiate the key icons to display the key icons; and
an electrical connector comprising a main portion, a first partial portion and a second partial portion extending from the main portion, the first partial portion electrically connected to the display panel, and the second partial portion electrically connected to the light sources, the main portion electrically connected to main board of the portable electronic device to control the light sources to turn on to emit light and irradiate the key icons to display the key icons.

2. The portable electronic device as claimed in claim 1, wherein the upper housing comprises a molding element, the molding element defines a receiving notch and a display window communicating to the bottom of the receiving notch, the touch panel is received in the receiving notch, the display panel is received in the display window.

3. The portable electronic device as claimed in claim 2, wherein the upper housing comprises an inserting element, the inserting element is positioned between the touch panel and the display panel, the inserting element defines a plurality of through grooves corresponding to the key icons, the light sources are formed on the display panel and pass through the through grooves to face the key icons.

4. The portable electronic device as claimed in claim 3, wherein the inserting element is made of steel and has a thickness of about 0.2 mm.

5. The portable electronic device as claimed in claim 3, wherein the inserting element is received in the display window, the surface of the inserting element facing to the touch panel is level to the surface of the receive notch.

6. The portable electronic device as claimed in claim 3, wherein the display panel comprises a wire arrangement formed on one surface of the display panel opposite to the inserting element, the first partial portion of the electrical connector electrically connects to the wire arrangement.

7. The portable electronic device as claimed in claim 3, wherein the main portion and the first partial portion both locate on the side of the display panel opposite to the inserting element, the second partial portion locates on the other side of the display panel facing to the light sources to connect the light sources.

8. The portable electronic device as claimed in claim 2, wherein the key icons are formed on one surface of the touch panel facing to the light sources.

9. The portable electronic device as claimed in claim 2, wherein the upper housing further comprises an adhesion member, the adhesion member surrounds the display window and is adhered on the surface of the receive notch to adhere the touch panel to the receive notch.

10. The portable electronic device as claimed in claim 9, wherein the adhesion member contacts the inserting element.

11. The portable electronic device as claimed in claim 1, wherein the display panel is a liquid crystal display module, the light sources are LED light sources.

12. A portable electronic device, comprising:
an upper housing;
a display panel mounted in the upper housing;
a touch panel mounted in the upper housing and facing to the display panel, the touch panel defining a plurality of key icons on the non-display area of the touch panel, the key icons being visible light transmittable ink icons;
a plurality of light sources formed on the display panel, each light source facing to one key icon, the light sources emitting light to directly irradiate the key icons to display the key icons; and
an electrical connector comprising a main portion, a first partial portion and a second partial portion extending from the main portion, the first partial portion electrically connected to the display panel, and the second partial portion electrically connected to the light sources, the main portion electrically connected to main board of the portable electronic device to control the light sources to turn on to emit light and irradiate the key icons to display the key icons.

13. The portable electronic device as claimed in claim 12, wherein the upper housing comprises a molding element, the molding element defines a receiving notch and a display window communicating to the bottom of the receiving notch, the touch panel is received in the receiving notch, the display panel is received in the display window.

14. The portable electronic device as claimed in claim 13, wherein the upper housing comprises an inserting element, the inserting element is positioned between the touch panel and the display panel, the inserting element defines a plurality of through grooves corresponding to the key icons, the light sources are formed on the display panel and pass through the through grooves to face the key icons.

15. The portable electronic device as claimed in claim 14, wherein the inserting element is received in the display window, the surface of the inserting element facing to the touch panel is level to the surface of the receive notch.

16. The portable electronic device as claimed in claim 14, wherein the display panel comprises a wire arrangement formed on one surface of the display panel opposite to the inserting element, the first partial portion of the electrical connector electrically connects to the wire arrangement.

17. The portable electronic device as claimed in claim 14, wherein the main portion and the first partial portion both locate on the side of the display panel opposite to the inserting element, the second partial portion locates on the other side of the display panel facing to the light sources to connect the light sources.

18. The portable electronic device as claimed in claim 13, wherein the upper housing further comprises an adhesion member, the adhesion member surrounds the display window and is adhered on the surface of the receive notch to adhere the touch panel to the receive notch.

19. The portable electronic device as claimed in claim 18, wherein the adhesion member contacts the inserting element.

* * * * *